Figure 1:
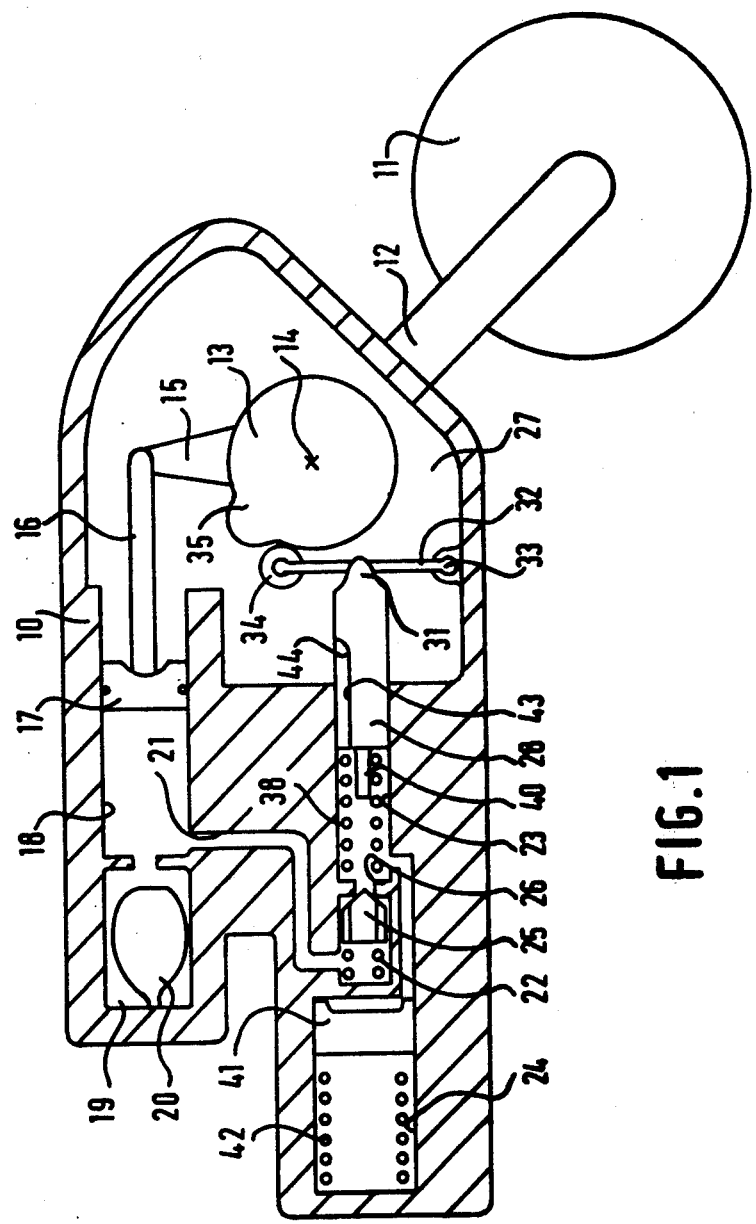

United States Patent [19]
Foster et al.

[11] 4,026,579
[45] May 31, 1977

[54] LIQUID/GAS SUSPENSION SYSTEMS

[75] Inventors: Brian Foster, Kenilworth; Frank Radcliffe Mortimer, Coventry, both of England

[73] Assignee: Dunlop Limited, London, England

[22] Filed: June 5, 1975

[21] Appl. No.: 584,119

[30] Foreign Application Priority Data
June 6, 1974 United Kingdom ............ 25165/74

[52] U.S. Cl. ............................ 280/705; 267/15 A
[51] Int. Cl.² ........................................ B60G 11/26
[58] Field of Search ......... 280/705, 708; 267/64 R, 267/64 A, 64 B, 121, 15 A

[56] References Cited
UNITED STATES PATENTS

| | | | |
|---|---|---|---|
| 3,459,439 | 8/1969 | Sinclair | 280/705 |
| 3,602,470 | 8/1971 | Reynolds | 280/705 |

Primary Examiner—Philip Goodman
Attorney, Agent, or Firm—Stevens, Davis, Miller & Mosher

[57] ABSTRACT

In a liquid/gas suspension system for a vehicle wherein shock loads caused by the vehicle moving over an uneven terrain are transmitted from a road wheel to a piston reciprocable in a cylinder fixed relative to the chassis, the piston pressurizing a liquid in which a gas spring is immersed, a device is provided for replenishing liquid leaked from the system and/or for relieving excess pressure in the system. Relative movements between the wheels and chassis reciprocates a pump which provides a reference pressure in a control chamber, and alternately communicate the control chamber with the system and with a reservoir to equalize any pressure differential between the control chamber and system and admit pressurized liquid to or relieve it from the control chamber, of which the following is a specification.

5 Claims, 2 Drawing Figures

LIQUID/GAS SUSPENSION SYSTEMS

The present invention relates to improvements in liquid/gas suspension systems by which is meant vehicle suspension systems of the kind in which shock loads received by the wheels or other ground engaging means of a vehicle are transmitted hydraulically to gas springs mounted on the chassis. Such systems are known as hydrogas suspension systems.

More particularly the invention provides a device whereby liquid leaked from such a system, whether deliberately or unintentionally, will be replenished so that the designed liquid volume of the system will be maintained and the system will not become inoperative through loss of liquid.

An object of the present invention is to provide a simple, economical and reliable device for maintaining liquid in such a system at a desired volume and pressure.

According to the invention there is provided a device for maintaining at a predetermined volume the liquid in a liquid/gas suspension system (as herein defined) of a vehicle wherein relative movement between parts of the vehicle caused by travelling over an uneven surface is utilized to supply liquid under pressure to the system.

Preferably control chamber under pressure is supplied to the system via a control chamber, and means is provided to communicate the control chamber with the suspension system to equalize pressure in the control-chamber and system. This arrangement will compare pressures in the control chamber and systems and either relieve excess pressure in the system or replenish liquid leaked from the system.

The pressure generating means may comprise a pump reciprocably mounted relative to the vehicle chassis and actuable in response to relative movement between the ground engaging part and the chassis. The pump may be arranged during a latter part of its pressure generating stroke to open a non-return valve which normally closes the system whereby the system is communicated with the control chamber.

Preferably the device comprises a reservoir with which the inlet side of the pump communicates, the reservoir being arranged to receive any liquid which leaks from the system whereby leaked liquid will be returned to the system by the device.

The device may form part of a system which includes a reciprocal piston connected to a member rotatably mounted on the vehicle chassis, the member being rotatable with a radially extending arm connected to a road wheel of the vehicle in such a way that the up and down movement of the wheel relative to the chassis tends to rotate the arm and rotatable member about the axis of the latter, thereby tending to reciprocate the piston. In this arrangement the pump may be actuable by a cam on the rotatable member via a transmission link pivoted at one end to the chassis, pivoted intermediate its ends to the pump and having a cam follower at its other end. The angular position of the cam on the rotatable member is such that it is not in contact with the cam follower when the suspension is under normal load but such that whenever the suspension is subject to abnormal load such as when the vehicle hits a bump the cam follower rides onto the cam to reciprocate the pump.

Figure 2:
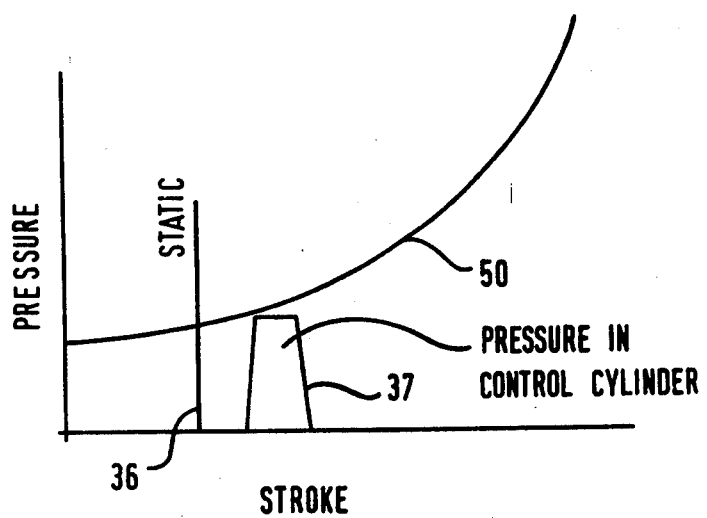

A preferred embodiment of the invention will now be described with reference to the accompanying drawings in which:

FIG. 1 is a side sectional elevation of a device in accordance with the invention; and FIG. 2 is a graph on which pressure in the control chamber and pressure in the system are plotted.

FIG. 1 diagrammatically represents a liquid/gas suspension system of the kind shown as a hydrogas suspension system provided in the chassis 10 of a road vehicle having a ground engaging wheel 11. As is known, an arm 12 on which the wheel 11 is rotatable extends radially from and is rotatable with a body 13, which is mounted on the chassis 10 to be rotatable about an axis 14. The body 13 also has a radial arm 15 and the free end of which is pivotally connected to a rod 16 in turn connected to a piston 17 which is reciprocable in a cylinder 18 in the chassis 10. Communicating with the cylinder 18 is a chamber 19 in which a gas spring 20 is located.

The components so far described represent the known hydrogas liquid/gas suspension system whereby shock loads received by the wheel 11 in passing over an uneven terrain are transmitted to the gas spring 20 via the arms 12 and 15 and piston 17 and an incompressible liquid in the chambers 18 and 19. When the piston 17 is displaced to the left, as viewed, from its normal position shown the energy is absorbed by a reduction in size of the gas spring 20. When the load is relieved the gas spring 20 resumes its normal dimensions and displaces the piston 17 back to the position shown.

In accordance with the invention, a piston 28 reciprocable in a bore 23 is pivoted at 31 to a link 32 intermediate the ends of the latter, one end of the link 32 being pivoted to the chassis 10 at 33 and its free end rotatably carrying a cam follower 34 which is arranged to be engaged by a cam 35 in the form of a radially extending lug on the body 13. The arrangement is shown in FIG. 1 in the position the parts occupy when the chassis is under normal load, e.g. when stationary. Application of a shock load to the wheel 11 will raise it relative to the chassis 10 causing the cam follower 34 to ride up on the cam 35. This in turn will displace the piston 28 to the left as viewed in the bore 23. When a momentary shock load is relieved the parts will resume the position shown or the cam 35 will move momentarily further from the cam follower 34 and the repeated application of shock loads to the wheel 11 as the vehicle moves over an uneven surface will cause the piston 28 to reciprocate in the bore 23, a spring 38 tending to return the piston 28 to the position shown.

The chambers 18 and 19 communicate with the bore 23 via a line 21 which is normally closed by a non-return valve 25, biassed by a spring 22 against its seat. The piston 28 is formed at its free end with a stem 40 which, during the latter part of the stroke of the piston, will unseat the valve 25 and thereby communicate the line 21 both with the bore 23 and with the pressure control chamber 24. In the latter a piston 41 is a sliding fit and is biassed by a spring 42 towards the end of the chamber 24 which is in communication with the bore 23.

A portion of the chassis 10 defines a reservoir 27 into which will flow any liquid leaked from the hydrogas suspension system, e.g. around the piston 17. Liquid in the reservoir 27 is maintained at a level such that the piston 28 is permanently immersed, and it will be noted that the free end portion of the piston 28 is cutaway to provide a groove 43 terminating at its rear end in a land 44. Thus when the piston 28 is in the fully retracted position shown the reservoir 27 is in communication with the bore 23 and chamber 24 via the groove 43 in the piston 28, but as the piston 28 moves inwardly of the bore 23 and groove 43 is closed off from the reservoir 27 by the land 44. This occurs before the valve 25 is unseated by the stem 40 of the piston.

FIG. 1 represents the normal relationship of the parts when not under abnormal load, and this condition is represented by the line 36 in FIG. 2. If a shock load is applied to the wheel 11, causing the body 13 to rotate about its axis 13, the piston 17 will move into the chamber 18 causing an increase in pressure in the hydrogas suspension system represented by the curve 50 in FIG. 2. At the same time the piston 28 will move into the bore 23, as the cam follower 34 rides up the cam 35, until liquid in the bore 23 is first isolated from the reservoir 27 by the land 44 and then pressurized by the continued inward movement of the piston 28, causing displacement of the piston 41 to the left as viewed in control chamber 24 against the action of spring 42. This pressure generated in the control chamber 24 by the piston 28 is represented by the curve 37 in FIG. 2.

A small shock load may be sufficient to produce pressure in the control chamber 24 without causing the piston 28 to move sufficiently into the bore 23 for its stem 40 to unseat the valve 25. Nevertheless, if at this moment pressure in the hydrogas suspension system is lower than that in the control chamber 24 (e.g. because of serious leakage of liquid from the hydrogas suspension system) the valve 25 will be unseated by the higher pressure on its downstream side, allowing the hydrogas suspension system to be replenished with liquid from the control chamber 24.

Under a shock load of normal magnitude, however, the piston 28 will move sufficiently into the bore 23 for the stem 40 to unseat the valve 25, placing the chambers 18 and 19 in communication with the control chamber 24.

Pressures are thus compared and equalized. If pressure in the chambers 18 and 19 is low, e.g. through leakage, liquid will be supplied to them by the action of spring 42 in chamber 24. On the other hand, if pressure in the hydrogas suspension system is abnormally high, e.g. through high temperature expansion, it will be relieved through the open valve 25, causing further displacement of the piston 41 to the left as viewed and further compression of the spring 42. When subsequently the piston 28 is retracted to the position shown in FIG. 1, either through relief of the shock load or through the cam follower running right over the cam 35, pressure in the control chamber 24 and bore 23 will be relieved by excess liquid discharging through the groove 43 to the reservoir 27.

The effect of this arrangement is that pressure in the hydrogas suspension system at the point represented by intersection of the curves 35 and 37 in FIG. 2 will be maintained at a value determined by the setting of the spring 42 in the control chamber 24.

Having now described our invention — what we claim is:

1. A liquid/gas suspension system for a vehicle comprising a liquid chamber, a gas spring located in the liquid chamber, a cylinder communicating with the liquid chamber, a main piston reciprocable in the cylinder to pressurize liquid in the chamber, the chamber and cylinder being fixed relative to the vehicle chassis, linkage means connecting the main piston to a member movable with a road wheel of the vehicle relative to the chassis so that the main piston is reciprocable in the cylinder in response to relative movement of said member and the chassis caused by the vehicle travelling over an uneven terrain, an auxiliary cylinder communicable with the liquid chamber and fixed relative to the chassis, a non-return valve interposed between the auxiliary cylinder and the liquid chamber biassed to prevent, in its closed position, the flow of liquid from the liquid chamber to the auxiliary chamber, a pump element reciprocable in the auxiliary cylinder, the pump element being adapted to admit liquid to the auxiliary cylinder during an initial portion of its stroke and to pressurize the liquid in the auxiliary cylinder during a latter part of its stroke, and linkage means interconnecting the pump element and a member movable with a road wheel of the vehicle whereby the pump element is caused to reciprocate in the auxiliary cylinder in response to relative movements between said member and the chassis caused by the vehicle moving over an uneven terrain whereby liquid is admitted to and pressurized in the auxiliary cylinder, and is admitted to the liquid chamber if there is a predetermined pressure differential between the auxiliary cylinder and the liquid chamber which unseats the non-return valve.

2. A device as claimed in claim 1, wherein means movable within the pump element is provided for mechanically unseating the non-return valve and is arranged to unseat the non-return valve during a latter part of the pressurizing stroke of the pump element.

3. A device as claimed in claim 2, wherein the control chamber is communicable with a reservoir, via the auxiliary cylinder and wherein the pump element is arranged to close off the control chamber from the reservoir during an initial part of the pressurizing stroke of the pump element so that thereafter liquid is pressurized in the control chamber by the pump element, and to open the control chamber to the reservoir during a latter part of the return stroke of the pump element.

4. A device as claimed in claim 2 wherein said means for mechanically unseating the non-return valve comprises a stem on the pump element arranged to contact the non-return valve during a latter part of the pressurizing stroke of the pump element.

5. A device as claimed in claim 1, wherein a spring is provided biassing a plunger to reduce the volume of the control chamber, the setting of the spring determining a reference pressure established in the control chamber by the pump element.

* * * * *